Sept. 20, 1927. 1,643,188
J. G. SWAIN
WHEEL AND DEMOUNTABLE RIM
Original Filed Sept. 22, 1921
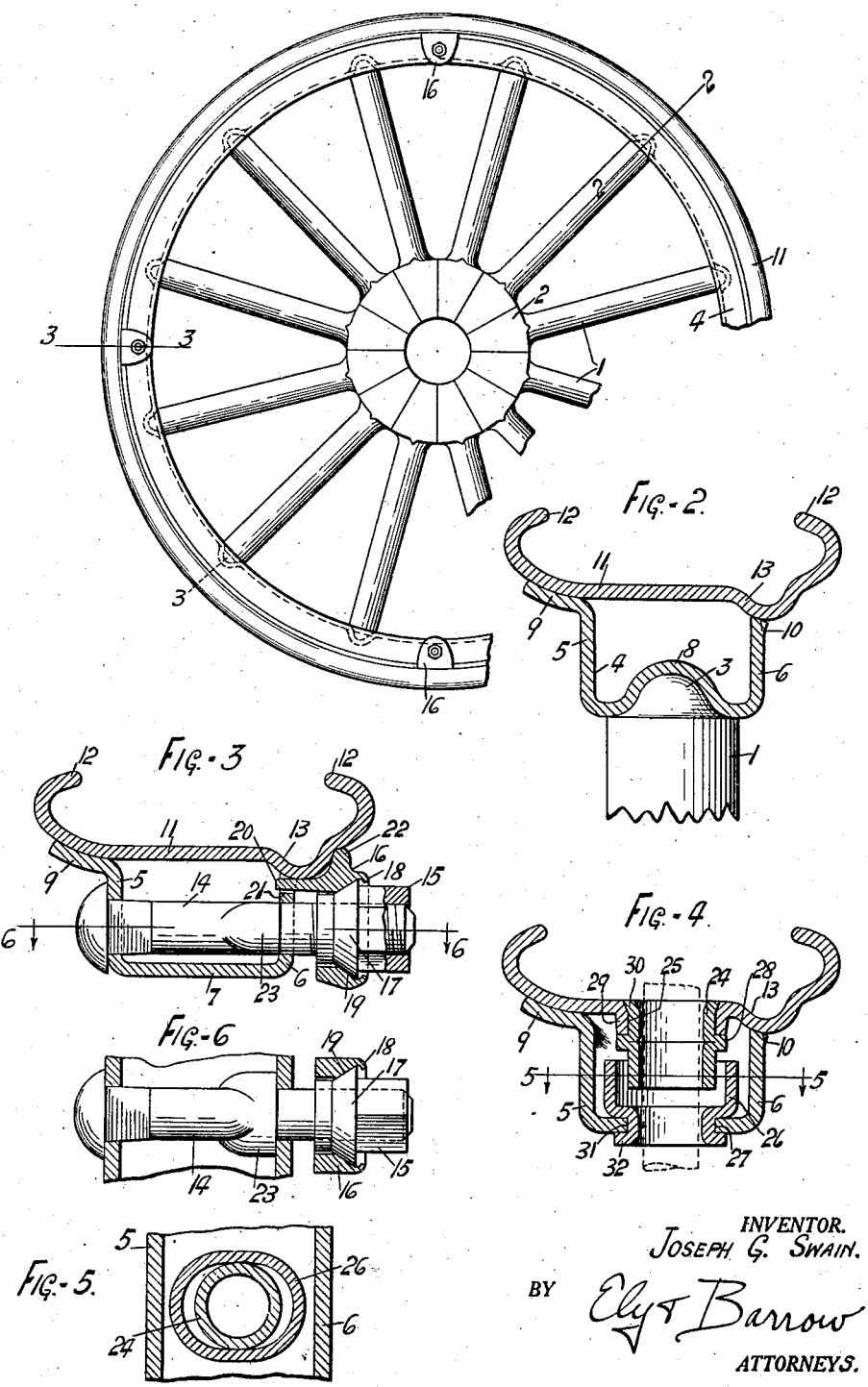
INVENTOR.
JOSEPH G. SWAIN.
BY
ATTORNEYS.

Patented Sept. 20, 1927.

1,643,188

UNITED STATES PATENT OFFICE.

JOSEPH G. SWAIN, OF AKRON, OHIO, ASSIGNOR TO THE FIRESTONE STEEL PRODUCTS COMPANY, OF AKRON, OHIO, A CORPORATION OF OHIO.

WHEEL AND DEMOUNTABLE RIM.

Original application filed September 22, 1921, Serial No. 502,328. Divided and this application filed December 23, 1926. Serial No. 156,533.

This invention relates to wheels for automobiles or similar vehicles in which there is employed a demountable rim for carrying a pneumatic tire, the object of the invention being to construct a light and inexpensive equipment which will satisfactorily serve the purpose to which it is put and which will be easy to manufacture and to operate.

Another purpose of my invention is to perfect a rim and felloe construction which can be rolled up out of flat stock, so that special hot rolled sections will not be required.

A further object of my invention is to combine a demountable rim with a steel felloed wheel to make a light, strong and easily operated unit. As an additional object, the construction of the means for locking the rim and the wheel from relative circumferential movement has been simplified and the clamping lugs have been improved.

Other objects and advantages will appear as the description proceeds, it being understood that the showing is for the purpose of enabling one skilled in the art to practise the invention and is not for the purpose of limiting the invention to the exact form shown.

This application is a division of my pending application Serial No. 502,328, filed September 22, 1921.

In the drawings:

Figure 1 is a side elevation of a wheel with the demountable rim thereon;

Figure 2 is a cross section through the felloe and rim taken at the spoke on the line 2—2 of Figure 1;

Figure 3 is a cross section through the felloe and rim taken at a clamping lug on the line 3—3 of Figure 1;

Figure 4 is a cross section at the valve stem opening;

Figure 5 is a section on the line 5—5 of Figure 4; and

Figure 6 is a section on the line 6—6 of Figure 3.

The wheel forming a part of the combination of this invention is formed of a plurality of wooden spokes 1, the inner ends 2 of which are mitered to form the hub of the wheel and the outer ends of which are formed with reduced rounded knobs 3.

The felloe or fixed rim is indicated by the numeral 4 and is rolled up from a strip of flat steel so as to have two parallel flanges 5 and 6. The base 7 of the felloe is formed with a number of pressed out sockets or cavities 8 in which the ends 3 of the spokes are seated. The wheel is usually or preferably formed by expanding the steel felloe to a greater circumference than its finished size, the spokes are assembled by placing the ends 3 in the sockets 8 and the steel rim is then compressed or upset upon the spoke ends, which action serves to seat the knobs 3 in the sockets and to force the mitered ends of the spokes together to form the hub.

One flange 5 of the steel felloe or fixed rim is formed with an outwardly bent flange or seat 9, which inclines upwardly to form a seat for one side of the rim. The other flange 6 is somewhat lower than the flange 7 and is formed with an inclined or tapered rim seat 10.

The demountable tire carrying rim is indicated as a whole by the numeral 11, being provided with two tire securing flanges 12. In the form shown, the flanges 12 are of a type designed to hold a clincher tire, but it will be understood that the invention is not limited to a clincher tire carrying rim.

One side of the rim 11 seats on the ledge or flange 9, while the other side is formed with a continuous rolled gutter or depression 13, which seats on the tapered surface 10 of the flange 6. By rolling the gutter or depression 13 in the flat stock, I am enabled to mount the tire carrying rim on the flanges of unequal height, without using a special steel section, the rim being rolled up out of flat stock.

To hold the tire rim in place on the steel felloe, or fixed rim, I employ a number of bolts 14 which pass transversely through the two flanges of the steel felloe, the outer end of each bolt being screw threaded and receiving a nut 15. On the nut 15 is loosely mounted the side clamp or lug 16, the nut and clamp being rotatively mounted with respect to one another but prevented from separation by a rib or enlargement 17 which is received within a downwardly turned flange or socket 18 on the clamp. The inner surface of the rib 17 is tapered or cone shaped as shown at 19 and the inner surface of the socket on the lug is correspondingly tapered. In actual practise there is some play between the clamp and the nut so that there is a slight rocking motion of the clamp on the bolt. The inner surface of each clamp is provided with a tongue or projection 20 which enters into a notch 21 of a greater depth than thickness of the tongue, cut in the upper surface of the flange 6 and on the upper portion of the clamp is formed a shoulder 22, the outer surface of which bears against the tire carrying rim at about the base of the gutter where it is pressed down from the rim. The surface of the clamp between the shoulder 22 and the tongue 20 is rounded so as to pass over the gutter, but not necessarily fit thereagainst. The bolt 14 may be provided with lugs or shoulders 23 which bear against the inner face of the flange 6 and prevent it from being bent over toward the flange 5. The tongue 20 is provided to perform a guiding function in keeping the clamp moving in a straight line inwardly as the nut 15 is tightened on the end of the bolt, and the notch permits rocking movement of the clamp on the nut.

In order to prevent circumferential movement of the tire rim on the steel felloe or fixed rim, I propose to use a thimble or sleeve 24 which is received in the valve stem hole 25 in the rim and mates with a second thimble or sleeve 26 received in the valve stem 27 on the felloe or fixed rim. The two sleeves mate in the manner shown in Figure 4, and serve as drivers for the rim and also as protectors for the valve stem.

The sleeve 24 is made from steel tubing and jammed or crimped to form a shoulder or ridge 28 which seats against the lower edge of the flange 29, which is struck downwardly from around the valve stem hole. The upper edge of the sleeve 24 is pressed downwardly around the valve stem hole 25 as at 30 which locks the sleeve in position.

The sleeve 26 on the felloe or fixed rim is formed with a depression or groove 31, in which the edge of the steel felloe is received and the lower end of the sleeve is crimped outwardly as at 32 to lock the sleeve in position.

As shown in Figure 5 the sleeve 24 may be round in cross section, while the upper end of the sleeve 26 may be elliptical with its long axis placed transversely of the felloe. The purpose of this particular arrangement is that while the rim is locked against circumferential movement about the wheel, a certain amount of relative lateral movement is permitted. The lateral movement of the tire rim aids in seating the rim on the wheel and in the demounting thereof.

What is claimed is:

1. In combination, a wheel structure having a fixed rim, and a tire rim removably mounted thereon, said wheel rim having parallel flanges of different heights, one side of said tire rim seated on the higher of said flanges, a continuous gutter rolled in the tire rim, said gutter seated on the lower flange, a plurality of separable clamps bearing against the side of said tire rim, a shoulder on each said clamp bearing against the rim and a tongue of said clamp received in a recess in the upper edge of a flange on the wheel rim whereby the clamp is guided in a straight line.

2. In a wheel structure, a fixed rim on the wheel and a tire rim removably carried thereon, said fixed rim having two parallel flanges, a continuous gutter rolled in the base of the tire rim and seated on one of said flanges and means for forcing the tire rim on the wheel rim said means comprising a clamping lug, a bolt passing through the flanges on the fixed rim and the clamping lug, a nut on the bolt bearing against the lug, a shoulder on the lug bearing against the rim at the base of the gutter, and a tongue on the clamp received in an aperture on the said flange beneath the gutter.

JOSEPH G. SWAIN.